(12) United States Patent
Sachter-Zeltzer et al.

(10) Patent No.: US 11,200,720 B2
(45) Date of Patent: Dec. 14, 2021

(54) GENERATING ANIMATION BASED ON STARTING SCENE AND ENDING SCENE

(71) Applicant: GOOGLE LLC, Mountain View, CA (US)

(72) Inventors: Ariel Sachter-Zeltzer, Sunnyvale, CA (US); Lee Brandon Keely, San Francisco, CA (US); Emily Shack, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 5 days.

(21) Appl. No.: 16/731,735

(22) Filed: Dec. 31, 2019

(65) Prior Publication Data
US 2021/0097747 A1 Apr. 1, 2021

Related U.S. Application Data

(60) Provisional application No. 62/906,633, filed on Sep. 26, 2019.

(51) Int. Cl.
*G06T 13/80* (2011.01)
*G06T 3/00* (2006.01)
*G06T 13/00* (2011.01)

(52) U.S. Cl.
CPC ............ *G06T 13/80* (2013.01); *G06T 3/0056* (2013.01); *G06T 3/0093* (2013.01); *G06T 2213/08* (2013.01); *G06T 2213/12* (2013.01)

(58) Field of Classification Search
None
See application file for complete search history.

(56) References Cited

U.S. PATENT DOCUMENTS 7,555,730 B2 * 6/2009 Atkins .................... G06T 11/60
715/713
7,965,294 B1 6/2011 Milliron
(Continued)

OTHER PUBLICATIONS

"Beautiful presentations for everyone. By everyone", Keynote—Apple (https://www.apple.com/keynote/), Printed Sep. 2, 2019, 8 pages.
(Continued)

*Primary Examiner* — Michael J Cobb
(74) *Attorney, Agent, or Firm* — Brake Hughes Bellermann LLP

(57) ABSTRACT

A method can include receiving a starting scene for display and an ending scene for display, the starting scene including at least a first graphical element in a first location and a second graphical element in a second location, the ending scene including at least the first graphical element in a third location and the second graphical element in a fourth location; generating multiple individual candidate animations based on the starting scene and the ending scene, each of the multiple candidate animations including display of the first graphical element transitioning from the first location to the second location and display of the second graphical element transitioning from the third location to the fourth location; for each of the multiple individual candidate animations, determining a score; selecting one of the individual candidate animations based on the determined scores for the individual candidate animations; and presenting the selected individual candidate animation.

20 Claims, 11 Drawing Sheets

(56) References Cited

U.S. PATENT DOCUMENTS

| | | | |
|---|---|---|---|
| 2003/0001843 A1 | 1/2003 | Suzuki et al. | |
| 2009/0066702 A1* | 3/2009 | Dion | G06T 13/00 |
| | | | 345/473 |
| 2013/0120358 A1* | 5/2013 | Fan | G06T 13/00 |
| | | | 345/419 |
| 2017/0018023 A1* | 1/2017 | Roux | G06Q 30/0641 |
| 2017/0256014 A1* | 9/2017 | Ather | G16H 40/20 |
| 2019/0114679 A1* | 4/2019 | Gangloff | G06T 13/80 |
| 2020/0039077 A1* | 2/2020 | Karol | B25J 11/0015 |

OTHER PUBLICATIONS

Blumberg, et al., "Multi-Level Direction of Autonomous Creatures for Real-Time Virtual Environments", MIT Media Lab, 1995, pp. 47-54.

Blumberg, "Old Tricks, New Dogs: Ethology and Interactive Creatures", Massachusetts Institute of Technology, Feb. 1997, 146 pages.

Johnson, "Build-a-Dude, Action Selection Networks for Computational Autonomous Agents", Media Arts and Sciences Section, Massachusetts Institute of Technology, Jan. 11, 1991, 92 pages.

\* cited by examiner

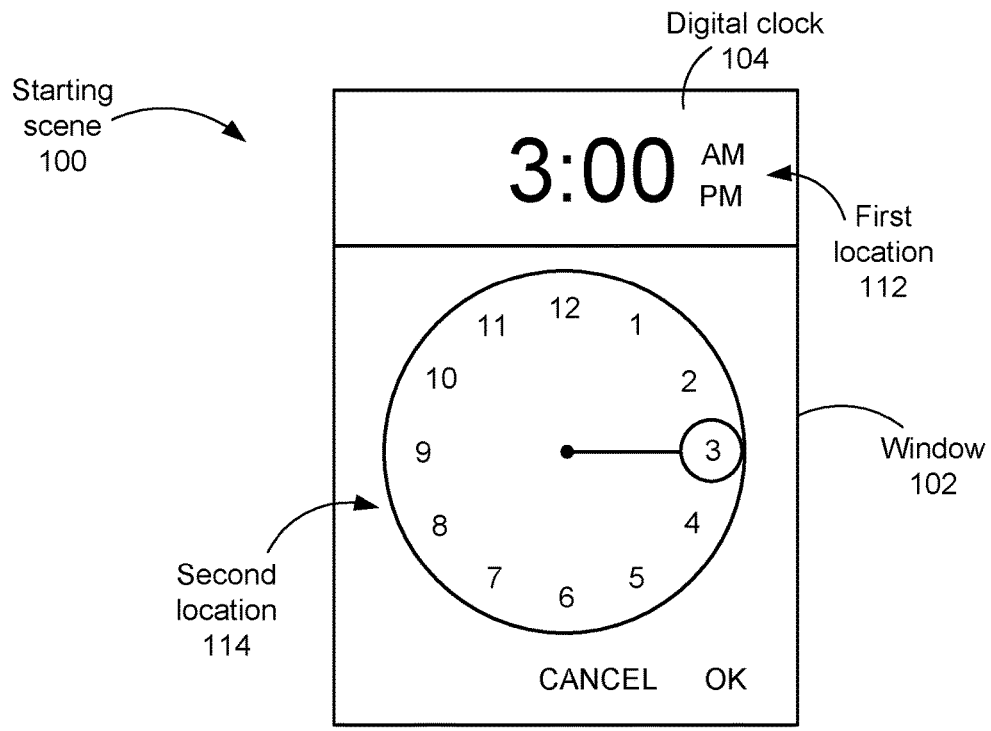
FIG. 2A
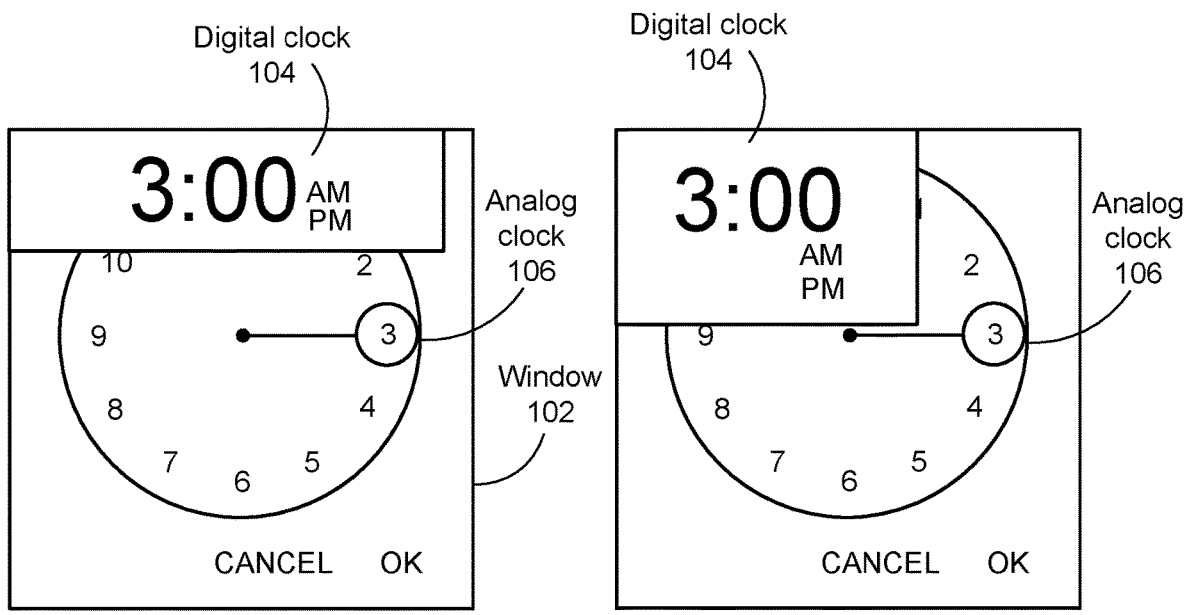
FIG. 2B
FIG. 2C

GENERATING ANIMATION BASED ON STARTING SCENE AND ENDING SCENE

PRIORITY CLAIM

This Application claims priority to U.S. Provisional Application No. 62/906,633, filed on Sep. 26, 2019, entitled, "GENERATING ANIMATION BASED ON STARTING SCENE AND ENDING SCENE," the disclosure of which is hereby incorporated by reference.

TECHNICAL FIELD

This description relates to animation design.

BACKGROUND

Designing and implementing animations can be a labor-intensive process. Multiple persons can be required to build an animation.

SUMMARY

According to an example, a method can include receiving, by a computing system, a starting scene for display and an ending scene for display, the starting scene including at least a first graphical element in a first location and a second graphical element in a second location, the ending scene including at least the first graphical element in a third location and the second graphical element in a fourth location, the first location being different than the third location, the third location being different than the fourth location; generating multiple individual candidate animations based on the starting scene and the ending scene, each of the multiple candidate animations including display of the first graphical element transitioning from the first location to the second location and display of the second graphical element transitioning from the third location to the fourth location; for each of the multiple individual candidate animations, determining a score, the score being based on the transitioning of the first graphical element independent of the second graphical element for the individual candidate animation, the transitioning of the second graphical element independent of the first graphical element for the individual candidate animation, and the transitioning of the first graphical element with respect to the transitioning of the second graphical element for the individual candidate animation; selecting one of the individual candidate animations based on the determined scores for the individual candidate animations; and presenting the selected individual candidate animation.

According to an example, a non-transitory computer-readable storage medium can store instructions thereon that, when executed by at least one processor, are configured to cause a computing system to receive a starting scene and an ending scene, the starting scene including at least a first graphical element in a first location and a second graphical element in a second location, the ending scene including at least the first graphical element in a third location and the second graphical element in a fourth location, the first location being different than the third location, the third location being different than the fourth location; generate multiple candidate animations based on the starting scene and the ending scene, each of the multiple candidate animations including the first graphical element transitioning from the first location to the second location and the second graphical element transitioning from the third location to the fourth location; determine a score for each of the multiple candidate animations, the score being based on the transitioning of the first graphical element independent of the second graphical element, the transitioning of the second graphical element independent of the first graphical element, and the transitioning of the first graphical element with respect to the transitioning of the second graphical element; select one of the multiple candidate animations based on the determined score; and present the selected candidate animation.

According to an example, a computing system can include at least one processor, and a non-transitory computer-readable storage medium comprising instructions stored thereon. When executed by at least one processor, the instructions can be configured to cause the computing system to receive a starting scene and an ending scene, the starting scene including at least a first graphical element in a first location and a second graphical element in a second location, the ending scene including at least the first graphical element in a third location and the second graphical element in a fourth location, the first location being different than the third location, the third location being different than the fourth location; generate multiple candidate animations based on the starting scene and the ending scene, each of the multiple candidate animations including the first graphical element transitioning from the first location to the second location and the second graphical element transitioning from the third location to the fourth location; determine a score for each of the multiple candidate animations, the score being based on the transitioning of the first graphical element independent of the second graphical element, the transitioning of the second graphical element independent of the first graphical element, and the transitioning of the first graphical element with respect to the transitioning of the second graphical element; select one of the multiple candidate animations based on the determined score; and present the selected candidate animation.

According to an example, a computing system can include means for receiving a starting scene and an ending scene, the starting scene including at least a first graphical element in a first location and a second graphical element in a second location, the ending scene including at least the first graphical element in a third location and the second graphical element in a fourth location, the first location being different than the third location, the third location being different than the fourth location; means for generating multiple candidate animations based on the starting scene and the ending scene, each of the multiple candidate animations including the first graphical element transitioning from the first location to the second location and the second graphical element transitioning from the third location to the fourth location; means for determining a score for each of the multiple candidate animations, the score being based on the transitioning of the first graphical element independent of the second graphical element, the transitioning of the second graphical element independent of the first graphical element, and the transitioning of the first graphical element with respect to the transitioning of the second graphical element; means for selecting one of the multiple candidate animations based on the determined score; and means for presenting the selected candidate animation.

The details of one or more implementations are set forth in the accompanying drawings and the description below. Other features will be apparent from the description and drawings, and from the claims.

BRIEF DESCRIPTION OF THE DRAWINGS

FIGS. 2A-2E show a candidate animation.

Like reference symbols in the various drawings indicate like elements.

DETAILED DESCRIPTION

Figure 1A:
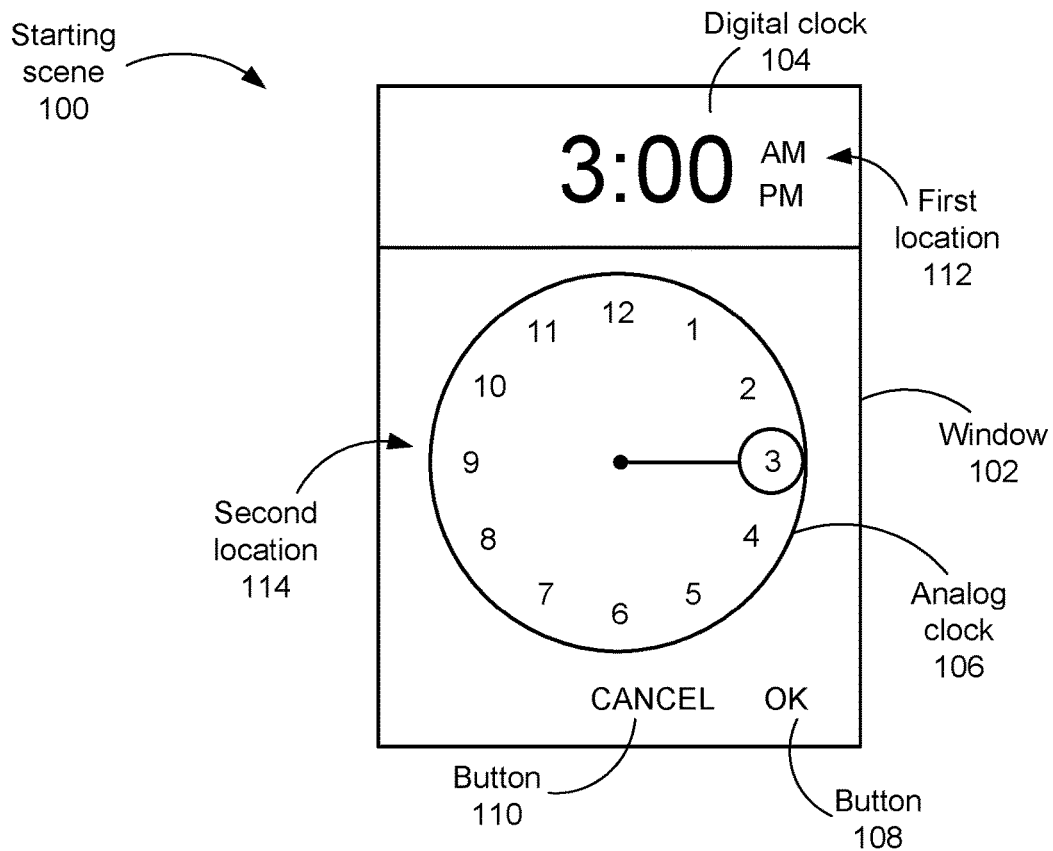
FIG. 1A shows a starting scene for an animation.

Graphical user interfaces typically comprise a particular arrangement of graphical elements. In some circumstances, in order to maintain the usability of the graphical user interface, it may be beneficial to switch the graphical elements from a first arrangement to a second arrangement. For example, when graphical information is displayed to a user on a computing device in a landscape mode and then the mode is changed to a portrait mode (e.g., either because the device is rotated or because the user changes the mode), the display of the information can be changed to be more suitable for the new portrait mode. Similarly, a change in the arrangement of graphical elements may be appropriate when the size of a displayed graphical user interface is reduced or minimized from an initial size to a reduced size. A technical problem is that simply ceasing to display the graphical information in a first arrangement (e.g. the landscape mode) and then displaying the information in a second arrangement (e.g. the portrait mode) may cause the user to temporarily lose track of certain elements of the graphical information after it appears in a new location/configuration in the second arrangement. This technical problem may temporarily impair the user's ability to interact with or effectively consume the graphical information.

One technical solution for addressing this technical problem is to provide an animation of the graphical user interface from the first arrangement to the second arrangement. The animation may serve to gradually transition the graphical elements from their location/configuration in the first arrangement to their new location/configuration in the second arrangement (i.e. by displaying a series of frames or scenes/arrangements that illustrate the graphical information in intermediate scenes/arrangements between the starting and ending scenes/arrangements). The present disclosure describes a technical solution in the form of a technical tool which has the technical benefits of efficiently performing the technical task of generating animations, which may allow users to follow graphical elements from their location in a first graphical user interface arrangement to their location in a second graphical user interface arrangement and thereby allow the user to more easily interact with and/or consume the graphical user interface in the moments immediately after the transition.

Transitions from a starting scene to an ending scene can be implemented in many different ways, which may include, for example, different lengths of time between for the animation of the transition, different paths of the elements in the scenes between their positions in the starting and ending scenes, different rotational positions of the elements during the transitions, different speeds of movement of the elements during the transitions (e.g., even for two different animations that take the same time overall, in one animation the elements may move slowly at the beginning of the animation and fast at the end of the animation, while in the other animation the elements may move quickly at the beginning of the animation and slowly at the end of the animation). A technical problem is that certain transitions may be difficult for a user to interact with and/or consume the graphical user interface in the moments immediately after the transition. Certain transitions may be more suitable than others for allowing the user to easily interact with and/or consume the graphical user interface in the moments immediately after the transition. A technical solution is the technical tool described herein, which can identify and generate a suitable animated transition based on defined starting and ending scenes.

The technical tool, which is referred to herein as an "animation application," has technical benefits including generating the animation without explicit human input describing transitions between the starting scene and ending scene, and/or based only on the inputs of the starting and ending scenes. In some examples, an animation designer can launch the animation application, and the animation application can receive the starting scene and ending scene from the animation designer via a scene builder interface, which can include a graphical user interface (GUI) that enables the user to build the starting and ending scenes by dragging and dropping graphical elements into the starting and ending scenes, and inputting features about the graphical elements. In some examples, the animation designer can express and/or build the starting and ending scenes in machine-executable code, such as code that can be compiled within a programming language. The animation application can generate the animation based on the received starting and ending scenes. The generated animation file can include a video file such as an MP4 file, 3GP file, OGG file, WMV file, WEBM file, FLU file, AVI file, QuickTime file, HDV file, MXF file, MPEG file, WAV file, LXF file, GXF file, or VOB file, as non-limiting examples.

The generated animation can transition displayed content of the first scene from the depiction of the displayed content in the starting scene to the depiction of the displayed content in the ending scene. The starting scene and the ending scene can include graphical elements, such as a first graphical element and a second graphical element. The graphical elements can be in different locations in the different scenes. In the starting scene, the first graphical element can be in a first location and the second graphical element can be in a second location. In the ending scene, the first graphical element can be in a third location, different than the first location, and the second graphical element can be in a fourth location, different than the second location. The animation application can cause the transition of the first graphical element (which can include, for example, a user interface graphical element, which can also be considered a graphical user interface element) from the first location in the starting scene to the third location in the ending scene. The animation application can cause the transition of the second graphical element from the second location in the starting scene to the fourth location in the ending scene.

The animation application can determine how to transition the display of the graphical elements from the starting scene to the ending scene, based on predefined plans, heuristic rules, decision trees, machine learning techniques, and/or optimization techniques, as non-limiting examples. The animation application can determine how to transition the display of the graphical elements based on predetermined possible transitions from the locations and/or appearances of the graphical elements in the starting scene to the locations and/or appearances of the graphical elements in the ending scene. In some examples, the animation application can generate multiple candidate animations based on the starting scene and the ending scene. Each of the multiple candidate animations can include the first graphical element transitioning from the first location to the third location and the second graphical element transitioning from the second location to the fourth location.

In some examples, the animation application can determine scores for multiple candidate animations. The scores can enable selection of one or more animations from the multiple candidate animations. In some examples, the scores may differentiate candidate animations which enable users to track the graphical elements through the whole transition and animations which do not. For instance, animations in which graphical elements become obscured by other graphical elements and/or in which graphical elements transition temporarily off the display may be assigned "worse" scores than are animations in which this does not occur. Other factors which may adversely affect the score determined for an animation may include the rotation of text during the animation. In addition or alternatively, animations which include well-connected features, flowing movements, and/or smooth transitions, as non-limiting examples, may be assigned "better" scores than are animations that include abrupt transitions, non-intuitive movements, and/or distracting features.

The scores can be based on the transitions of the elements independent of each other, and/or the scores can be based on transitions of one or more elements with respect to each other. In some implementations, the scores can be based on the transitioning of the first graphical element independent of the second graphical element, the transitioning of the second graphical element independent of the first graphical element, and/or the transitioning of the first graphical element with respect to the transitioning of the second graphical element. The scores can distinguish between animations with features associated with good animations and animations with features associated with bad animations. For example, in some implementations, the score can include a penalty for the first graphical element crossing paths with the second graphical element. In some implementations, the score can include a penalty for text included in a graphical element that rotates during the animation. In some implementations, the score can include a penalty for a graphical element transitioning out of the animation and/or being less than fully visible in the animation. The animation application can select one of the multiple candidate animations based on the determined score. The animation application can present the selected animation to a user. Determining scores for multiple candidate animations is one example of selecting an animation from among multiple possible animations from the starting scene to the ending scene. Other examples can include generating an animation based on a starting and ending scene using heuristics, rules, machine learning techniques, and/or decision trees as non-limiting examples, without generating multiple candidate animations and determining scores for the multiple candidate animations.

FIG. 1A shows a starting scene 100 for an animation. This is one example of an animation, and many more animations can be generated with different starting scenes and ending scenes than the starting scene 100 and ending scene 150 (shown in FIG. 1B) shown herein. The starting scene 100 may have been created by an animation designer as a starting position for an animation. A problem with generating an animation based on a starting scene 100 and an ending scene 150 (shown and described with respect to FIG. 1B) is that, with multiple graphical elements in the starting scene 100 and ending scene 150, and multiple possible transitions for the graphical elements from the starting scene 100 to the ending scene 150, generating an optimal animation by specifying the transitions of the graphical elements can be difficult and time consuming, and programming these transitions can be difficult.

The starting scene 100 can include multiple graphical elements. The multiple graphical elements can be included in, and/or surrounded by, a window 102. The window 102 can have a shape and/or size selected by the animation designer. In the example shown in FIG. 1A, the window 102 has a rectangular shape. In this example, a height of the window 102 is greater than a width of the window 102.

In some examples, the animation designer can build the starting scene via a scene builder interface presented by the animation application. The animation application can present the scene builder interface to the animation designer via a display in communication with a computing system, such as the computing system 600 shown in FIG. 6. The computing system 600 can receive the starting scene 100 and ending scene 150 (shown in FIG. 1B) via the scene builder interface. The scene builder interface can present graphical elements to the user for placement into the starting scene 100. In some examples, the scene builder interface can include a search bar that receives queries from the animation designer. Based on the queries, the scene builder interface can present graphical elements that match and/or are similar to the query that the scene builder interface received from the user. The animation designer can select graphical elements from the presented graphical elements, and arrange selected graphical elements within the window 102 and/or with respect to each other, and the scene builder interface can build the starting scene 100 based on the selection and arrangement received from the animation designer. The animation designer can also select a size and/or shape of the window 102, and the scene builder interface can generate a window for the starting scene based on the selection of size and/or shape received from the user. The scene builder interface can receive, from the animation designer, and/or store, features of the graphical elements, such as features described below with respect to FIG. 4.

In the example shown in FIG. 1A, the graphical elements include a digital clock 104, an analog clock 106, an ok button 108, and a cancel button 110. In some implementations, the digital clock 104 can be considered a first graphical element. In some implementations, the numerals on the digital clock 104 can be considered first graphical element(s) and can, for example, change type from Roman numerals to Arabic numerals during an animation. The digital clock 104 can be displayed in a first location 112 in the window 102 in the starting scene 100. In the example shown in FIG. 1A, the first location 112 is a top portion of the window 102 in the starting scene 100. The digital clock 104 can be a graphical user interface element that receives input and prompts a response, within the window 102 and/or within the digital clock 104 to the received input. The user can, for example, provide keyboard input, cursor input, and/or touch input in the example of a touchscreen, to the digital clock 104 to change the displayed time.

The analog clock 106 can be considered a second graphical element. In a starting scene 100, the analog clock 106 can be displayed within a second location 114 within the window 102. In the starting scene, the second location 114 can be a middle and/or lower portion of the window 102. In some examples, the analog clock 106 can be a graphical user interface element that receives input from a user, such as cursor input, to change the displayed time. In some examples, the analog clock 106 and digital clock 104 can display the same time, so that changes to one of the digital clock 104 or the analog clock 106 will be propagated to the other clock.

The ok button 108 can be considered a third graphical element. The ok button 108 can be disposed in a location within the starting scene 100 and/or window 102 below the analog clock 106. In some examples, the ok button 108 can be a user interface graphical element that responds to cursor input by propagating input, such as a displayed time, to a computing system that is displaying the starting scene 100 and/or graphical elements 104, 106, 108, 110.

The cancel button 110 can be considered a fourth graphical element. The cancel button 110 can be disposed in a location within the starting scene 100 and/or window 102 below the analog clock 106 and/or to the left of the ok button 108. In some examples, the cancel button 110 can be a user interface graphical element that responds to cursor input by closing the starting scene 100 and/or window 102 without propagating input to the computing system that is displaying the starting scene 100 and/or graphical elements 104, 106, 108, 110.

Figure 1B:
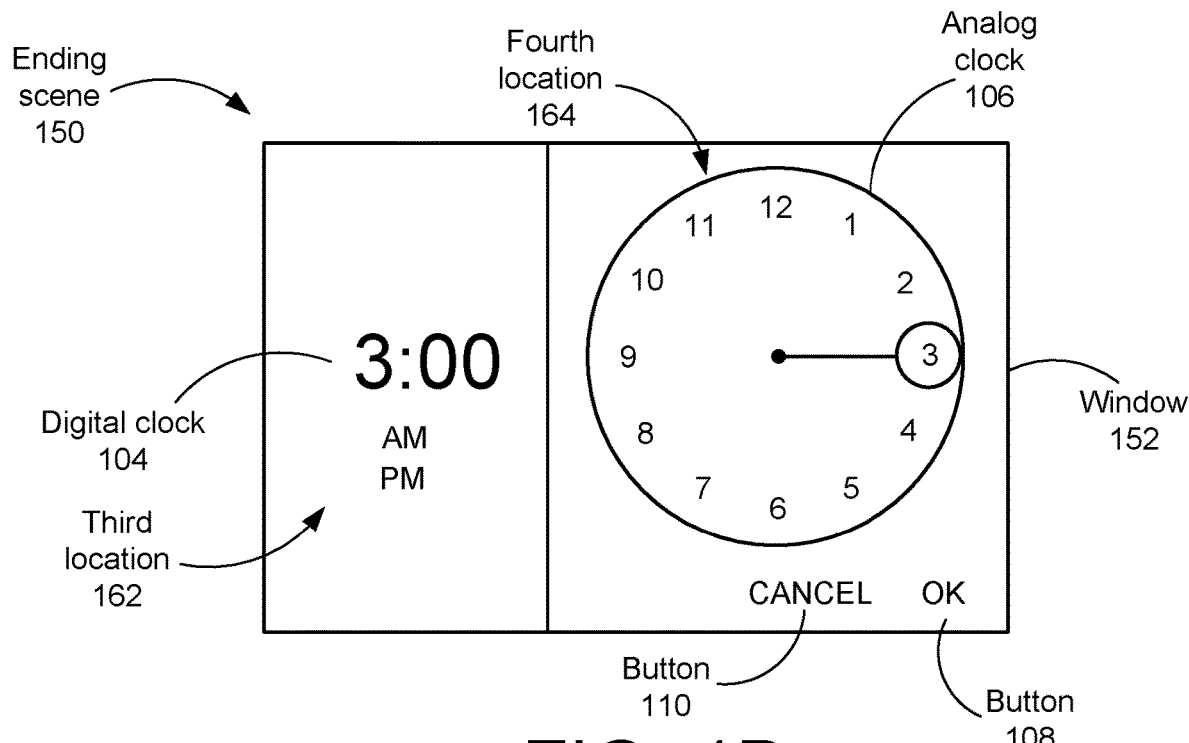
FIG. 1B shows an ending scene for the animation.
Figure 2D:
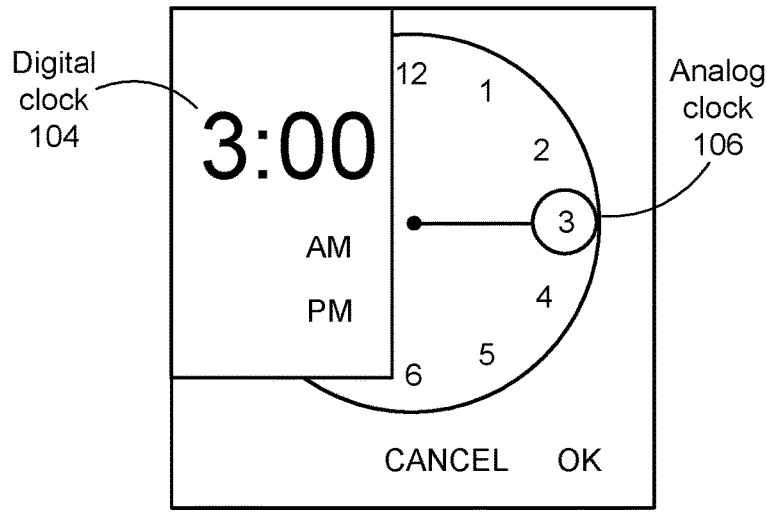
Figure 2E:
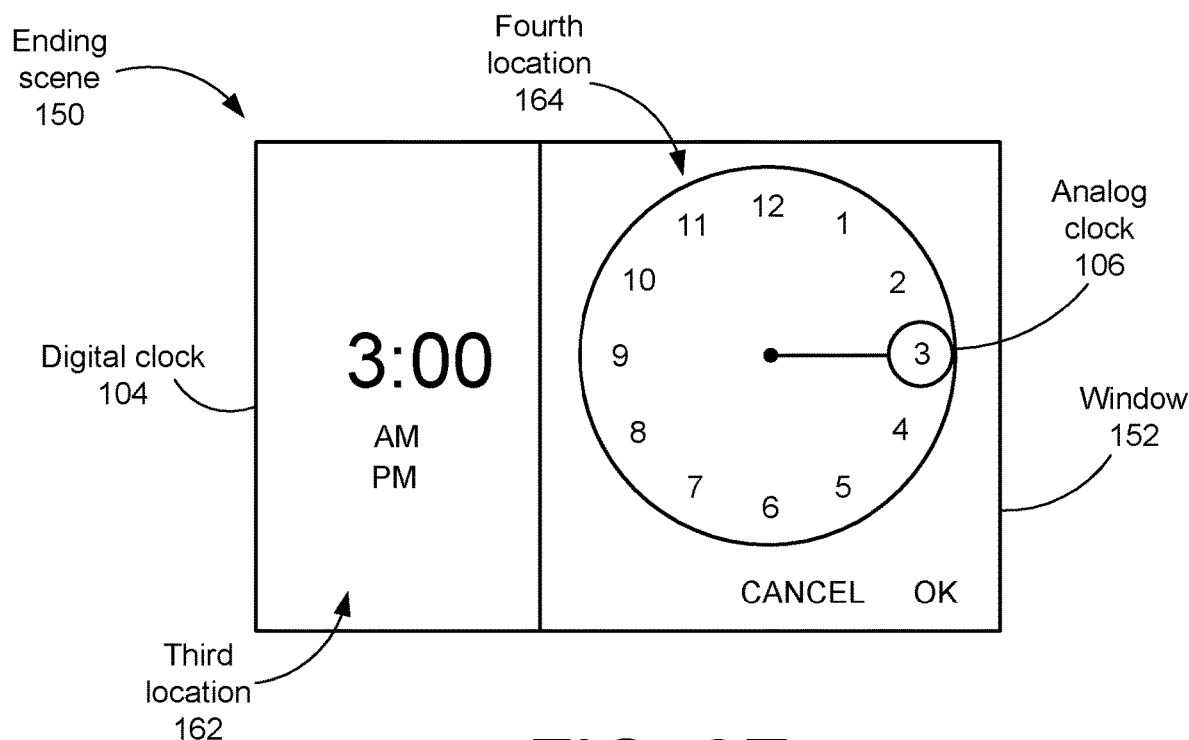
Figure 3A:
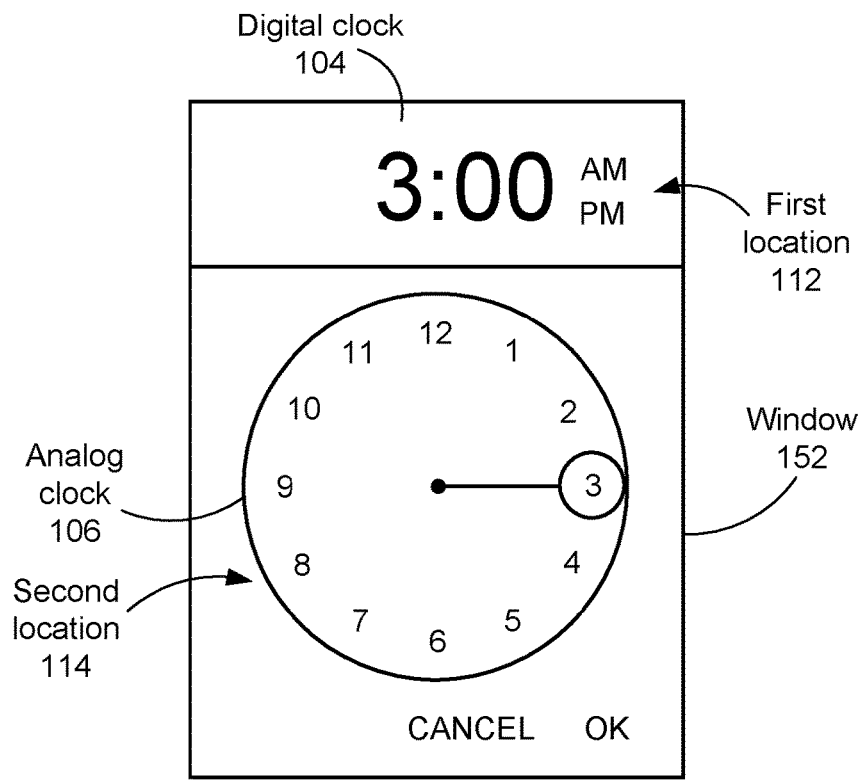
FIGS. 3A-3E show a candidate animation.
Figure 3B:
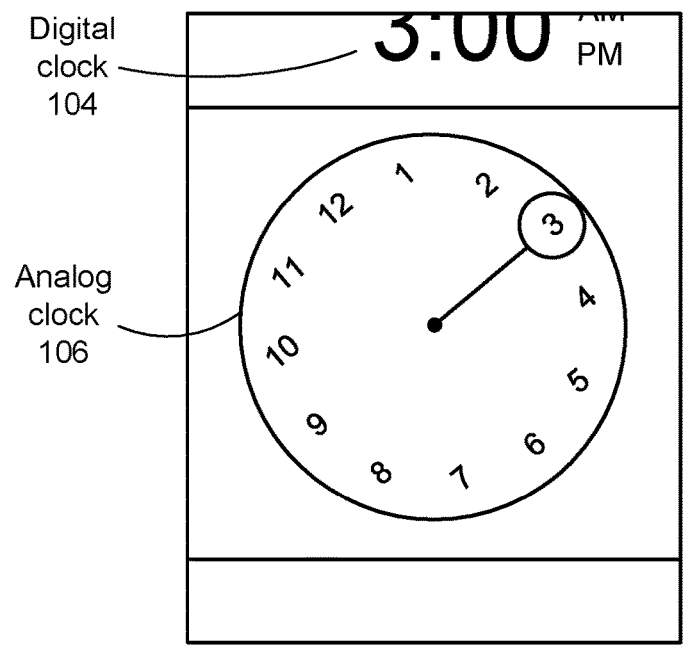
Figure 3C:
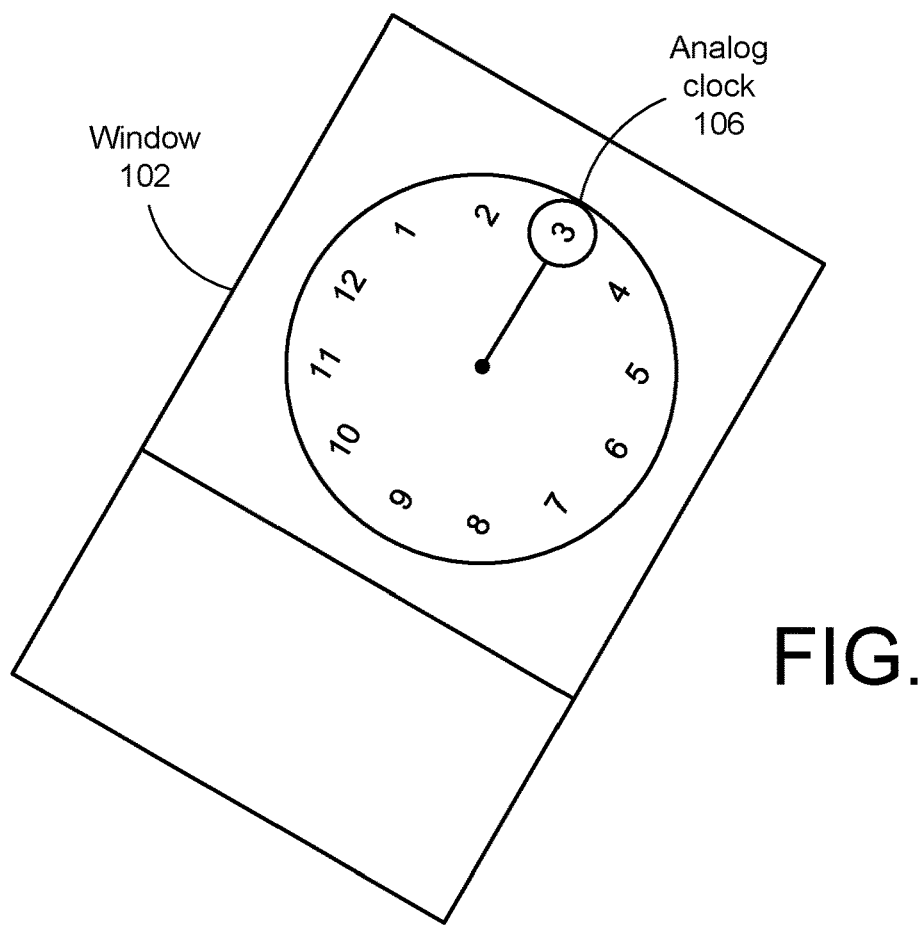
Figure 3D:
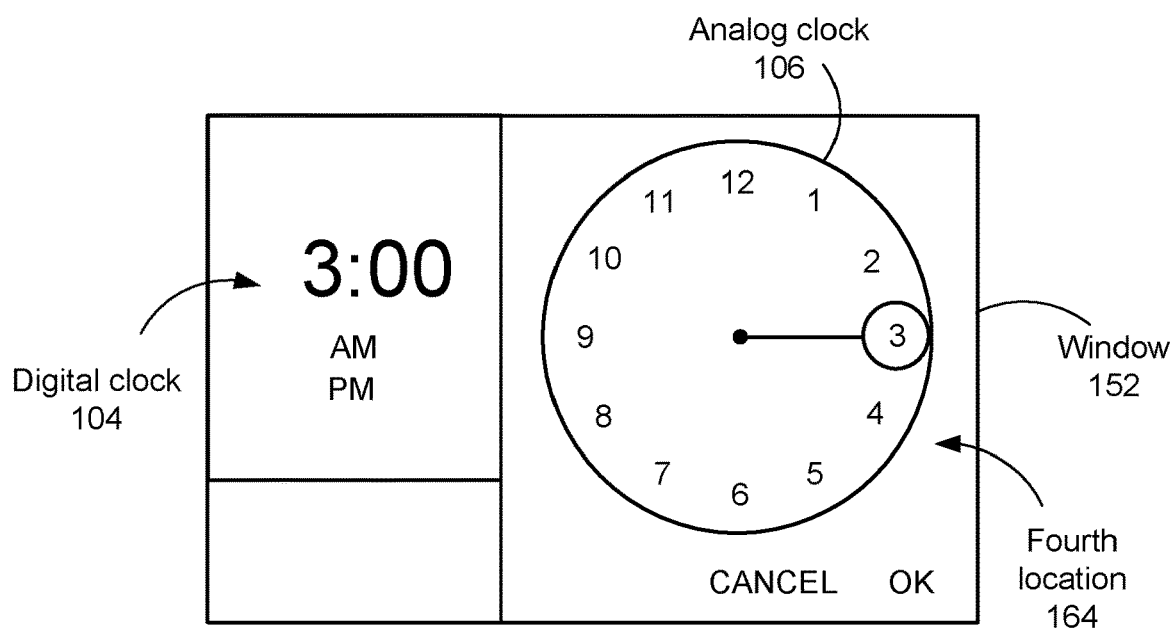
Figure 3E:
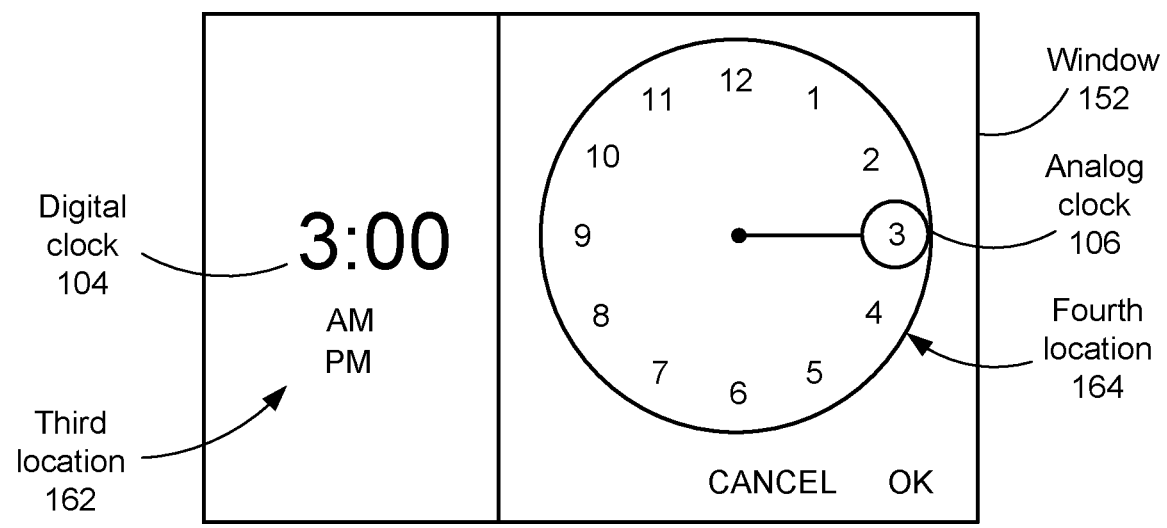

FIG. 1B shows an ending scene 150 for the animation. The ending scene 150 may have been created by the animation designer as an ending position for the animation. The animation designer 150 can create the ending scene 150 via a scene builder interface, and/or the animation application can build the ending scene 150 in response to input received via the scene builder interface, similar to building the starting scene 100 as described above with respect to FIG. 1A. In some examples, the animation application can determine a length of the animation, and/or time to transition from the starting scene 100 to the ending scene 150, based on input received from the animation designer, such as via the scene builder interface. The animation application can determine transitions from the starting scene 100 shown in FIG. 1A to the ending scene 150 shown in FIG. 1B.

The ending scene 150 can include multiple graphical elements. The multiple graphical elements can be included in, and/or surrounded by, a window 152. The window 152 can have a shape and/or size selected by the animation designer. In the example shown in FIG. 1B, the window 152 has a rectangular shape. In this example, a width of the window 152 is greater than a height of the window 152. In this example, a shape of the window 152 and/or ending scene 150 is different than a shape of the window 102 and/or starting scene 100. The different shape of the ending scene 150 than the starting scene 150 can accommodate rotation of a mobile computing device with a rectangular display.

The ending scene 150 can include the same graphical elements as the starting scene 100. In this example, the ending scene 150 includes the digital clock 104, the analog clock 106, the ok button 108, and the cancel button 110 that were included in the starting scene 100. Some or all of the graphical elements can be in different locations in the ending scene 150 than in the starting scene 100. In this example, the digital clock 104 is in a third location 162, different than the first location 112, in a left portion of the window 152 and/or ending scene 150. Also in this example, the analog clock 106 is in a fourth location 164, different than the second location 114, in a middle and/or right portion of the window 152 and/or ending scene 150. In the example shown in FIGS. 1A and 1B, the ok button 108 and cancel button 110 remain in same locations with respect to the analog clock 106, and/or have fixed spatial relationships with respect to the analog clock 106.

The animation application can determine how to transition and/or move the graphical elements 104, 106, 108, 110 from their respective locations in the starting scene 100 and/or window 102 to the ending scene 150 and/or window 152. The animation application can, for example, move each of the graphical elements 104, 106, 108, 110 along a continuous path such as a straight path or a curved path, fade the graphical elements 104, 106, 108, 110 out of their respective locations in the starting scene 100 and/or window 102 and into their respective locations in the ending scene 150 and/or window 152, and/or move the graphical elements 104, 106, 108, 110 out of the starting scene 100 and/or window 102 and into the ending scene 150 and/or window 152, as non-limiting examples.

In some examples, the animation application can determine the transitions for the graphical elements 104, 106, 108, 110 by selecting transitions from multiple predetermined transitions. In some examples, the multiple predetermined transitions can be stored in a transition library. In some examples, the animation application can select and/or determine the transitions for the graphical elements concurrently and/or independently of each other, and/or the animation application can select the transitions for the graphical elements randomly. In some examples, the animation application can select and/or determine the transitions for the graphical elements in an order based on relative priorities of the graphical elements. In some examples, the animation application can determine the priorities of the graphical elements based on input received from the animation designer via the scene builder interface, such as based on explicit indications of rankings and/or priorities received from the animation designer via the scene builder interface, and/or based on a chronological order in which the scene builder interface received input to add the graphical elements to the scene, such as prioritizing graphical elements higher that were added to the starting scene earlier and/or first.

In some examples in which the animation application determines transitions for the graphical elements in the order based on relative priorities of the graphical elements, the animation application can determine the transitions based on heuristics, rules, machine learning techniques, optimization techniques, and/or decision trees, as non-limiting examples. For example, after transitioning the graphical element with the highest priority (such as the digital clock 104) from the first location 112 in the starting scene 100 to the ending scene 150, the animation application can determine a transition for the graphical element with the next priority (such as the analog clock 106) based on a rule such as not allowing the graphical element with the next priority to cross paths with the graphical element with the highest priority. Similar rules can be applied to subsequent determinations of transitions of graphical elements with lower priorities.

In some examples, the animation application can generate multiple candidate animations. In some examples, the animation application can generate the multiple candidate animations by randomly selecting transitions from the predetermined transitions for the graphical elements, generating multiple permutations of possible transitions. The animation application can determine a score for each of the candidate animations based on factors such as the transitioning of the first graphical element (such as the digital clock 104) independent of the second graphical element (such as the analog clock 106), the transitioning of the second graphical element independent of the first graphical element, and/or the transitioning of the first graphical element with respect to the transitioning of the second graphical element. The animation application can select one of the candidate animations based on the determined score, such as by selecting a candidate animation with a "best" score (e.g. the highest score or the lowest score). The animation application can present the selected animation to the animation designer.

In some examples, the score can be considered a cost, with a cost applied for undesired features (e.g. those which adversely affect the user's ability to track graphical elements) included in the candidate animation. The candidate animation with the lowest determined cost can be selected. In some examples, the cost can be increased based on a graphical element crossing paths with another graphical element during the candidate animation. In some examples, the cost can be increased based on a graphical element that includes text rotating during the animation and/or during the transitioning of the graphical element during the animation. In some examples, when the shape of the ending scene 150 is different than the shape of the starting scene 100, and/or when the shape of the window 152 in the ending scene 150 is different than the shape of the window 102 in the starting scene 100, the cost can be increased based on part of a graphical element leaving the scene and/or window, which can be considered a transition independent of other graphical elements, and/or based on less than all of the first graphical element being displayed for a portion of the candidate animation, which can be considered a transition independent of other graphical elements.

FIGS. 2A-2E show a candidate animation. In this example, the candidate animation transitions from the starting scene 100 to the ending scene 150 by changing the shape of the window 102, 152 and digital clock 104, and moving the digital clock 104 along a path from the first location 112 to the third location 162 that crosses over, and/or crosses paths with, the analog clock 106. The score and/or cost for the candidate animation shown in FIGS. 2A-2E could be negatively impacted by the digital clock 104 crossing paths with the analog clock 106, which can be considered a transition of the digital clock 104 with respect to the analog clock 106 and/or a transition of the analog clock with respect to the digital clock 104.

FIGS. 3A-3E show a candidate animation. In this example, the window 102 rotates from the shape shown in the starting scene 100 to the shape shown in the ending scene 150. Also in this example, the digital clock 104 transitions out of the first location of the window 102 and is not viewable for a portion of the animation, and then transitions into the third location 162 by increasing a portion of the digital clock 104 that is visible, until reaching the appearance of the ending scene 150, which can be considered a transition of the digital clock independent of the analog clock.

The score and/or cost for the candidate animation shown in FIGS. 3A-3E could be negatively impacted by the portion of the digital clock 104 not being visible for the portion of the animation, which can be considered a transition of the digital clock 104 independent of the analog clock 106. However, the negative impact due to the portion of the digital clock 104 not being visible for the portion of the animation may be less than the negative impacted of the digital clock 104 crossing paths with the analog clock 106 in the candidate animation shown in FIGS. 2A-2E (which can be considered a transition of the digital clock 104 with respect to the analog clock 106 and/or a transition of the analog clock 106 with respect to the digital clock 104). The smaller negative impact due to the portion of the digital clock 104 not being visible for the portion of the animation in the candidate animation shown in FIGS. 3A-3E than the negative impact of the digital clock 104 crossing paths with the analog clock 106 in the candidate animation shown in FIGS. 2A-2E can cause the candidate animation shown in FIGS. 3A-3E to have a higher score and/or lower cost than the candidate animation shown in FIGS. 2A-2E, resulting in the animation shown in FIGS. 3A-3E being selected as the selected animation.

Figure 4:
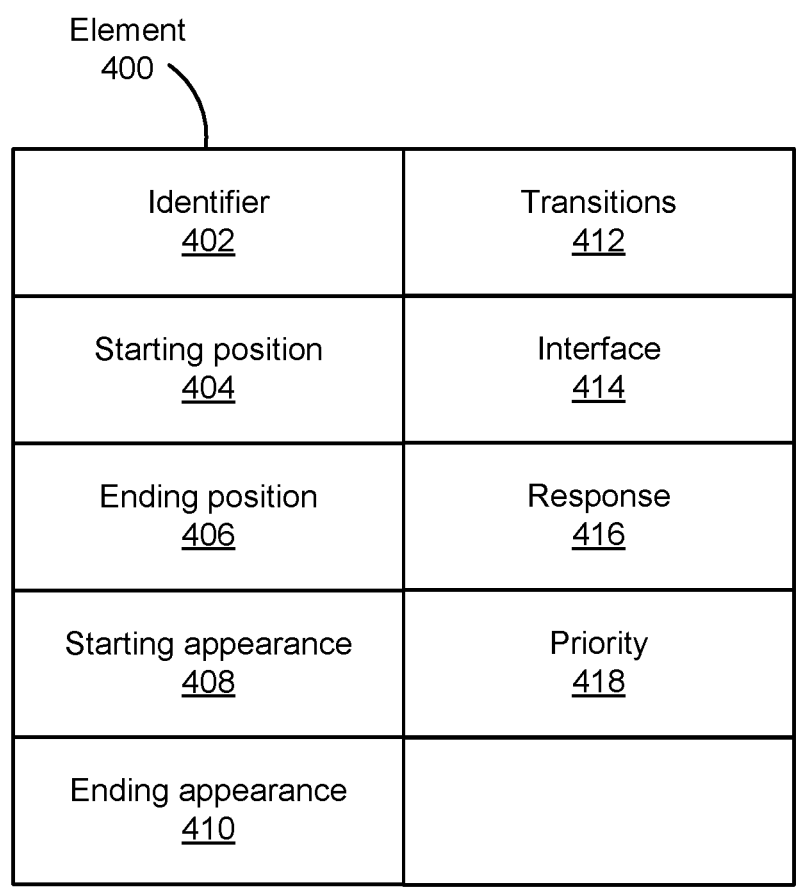
FIG. 4 is a block diagram of a graphical element included in the starting and ending scenes.

FIG. 4 is a block diagram of a graphical element 400 included in the starting scene and ending scene. The graphical element 400 shown in FIG. 4 can represent an object stored in a database accessible by the animation application. The graphical element 400 can store features and/or attributes of any graphical element included in a starting scene such as the starting scene 100, an ending scene such as the ending scene 150, and/or an animation transitioning from the starting scene 100 to the ending scene 150. The digital clock 104, analog clock 106, ok button 108, and cancel button 110 are examples of graphical elements for which the graphical element 400 can store features and/or attributes.

The graphical element 400 can store an identifier 402. The identifier 402 can include a number or other unique sequence of characters that uniquely identifies the graphical element 400.

The graphical element 400 can store a starting position 404. The starting position 404 can indicate a location within the starting scene and/or window in which the graphical element is initially disposed. In the example shown in FIG. 1A, the starting position 404 can indicate the first location 112 if the graphical element 400 represents the digital clock 104, or the starting position 404 can indicate the second location 114 if the graphical element represents the analog clock 106.

The graphical element 400 can store an ending position 406. The ending position 406 can indicate a location within the ending scene and/or window in which the graphical element is disposed after the animation has completed. In an example in which the graphical element moves during the animation, the ending position 406 can be different than the starting position 404. In an example in which the graphical element remains stationary during the animation, the ending position 406 can be the same as, and/or identical to, the starting position 404. In the example shown in FIG. 1B, the ending position 406 can indicate the third location 162 if the graphical element 400 represents the digital clock 104, or the ending position 406 can indicate the fourth location 164 if the graphical element represents the analog clock 106.

The graphical element 400 can store a starting appearance 408. The starting appearance 408 can indicate and/or describe an appearance of the graphical element within the starting scene. The starting appearance 408 can indicate one or more shapes, one or more colors, and/or one or more sizes of the graphical element. In the example of FIG. 1A, the starting appearance 408 can indicate and/or describe the appearance of the digital clock 104, the analog clock 106, the ok button 108, or the cancel button 110.

The graphical element 400 can store an ending appearance 410. The ending appearance 410 can indicate and/or describe an appearance of the graphical element within the ending scene. The ending appearance 410 can indicate one or more shapes, one or more colors, and/or one or more sizes of the graphical element. In the example of FIG. 1B, the ending appearance 410 can indicate and/or describe the appearance of the digital clock 104, the analog clock 106, the ok button 108, or the cancel button 110. In some examples, the graphical element can maintain a same appearance throughout the animation, and the ending appearance 410 can be the same as, and/or identical to, the starting appearance 408. In some examples, the graphical element can change appearance during the animation, and the ending appearance 410 can be different than the starting appearance 408.

The graphical element 400 can store transitions 412. The transitions 412 can include changes in position and/or location of the graphical element from the starting position 404 to the ending position 406, and/or changes in appearance of the graphical element from the starting appearance 408 to the ending appearance 410. The transitions 412 can store sufficient representations of the positions and/or appearances of the graphical element to generate an animation of the graphical element. In some examples, the transitions 412 can store frame-by-frame positions and/or appearances of the graphical element. The transitions 412 can be generated by the animation application.

The graphical element 400 can store an interface 414. The interface 414 can indicate whether the graphical element 400 can receive input from a user via the graphical element. The interface 414 can, for example, indicate whether the graphical element such as a user interface graphical element can receive text input, whether the graphical element can receive cursor input, and/or whether the graphical element is not a user interface graphical element and cannot receive input.

The graphical element 400 can store a response 416. The response 416 can indicate whether, and/or how, the graphical element and/or the computing system respond to input, in examples in which the interface 414 indicates that the graphical element receives input. The response 416 can indicate whether, for example, the digital clock 104 changes the displayed time in response to text input, or whether the computing system will respond to input via the graphical element.

The graphical element 400 can store a priority 418. The priority 418 can determine a priority of animation and/or transition of the graphical element 400. The animation application can, for example, determine transitions of graphical elements with higher priority first and/or earlier. The animation application can determine transitions of graphical elements with lower priorities later, with the transitions of the graphical elements with lower priorities being constrained by the previously-determined transitions of graphical elements with higher priorities, such as by preventing the graphical elements with lower priorities from crossing paths with the graphical elements with higher priorities.

Figure 5:
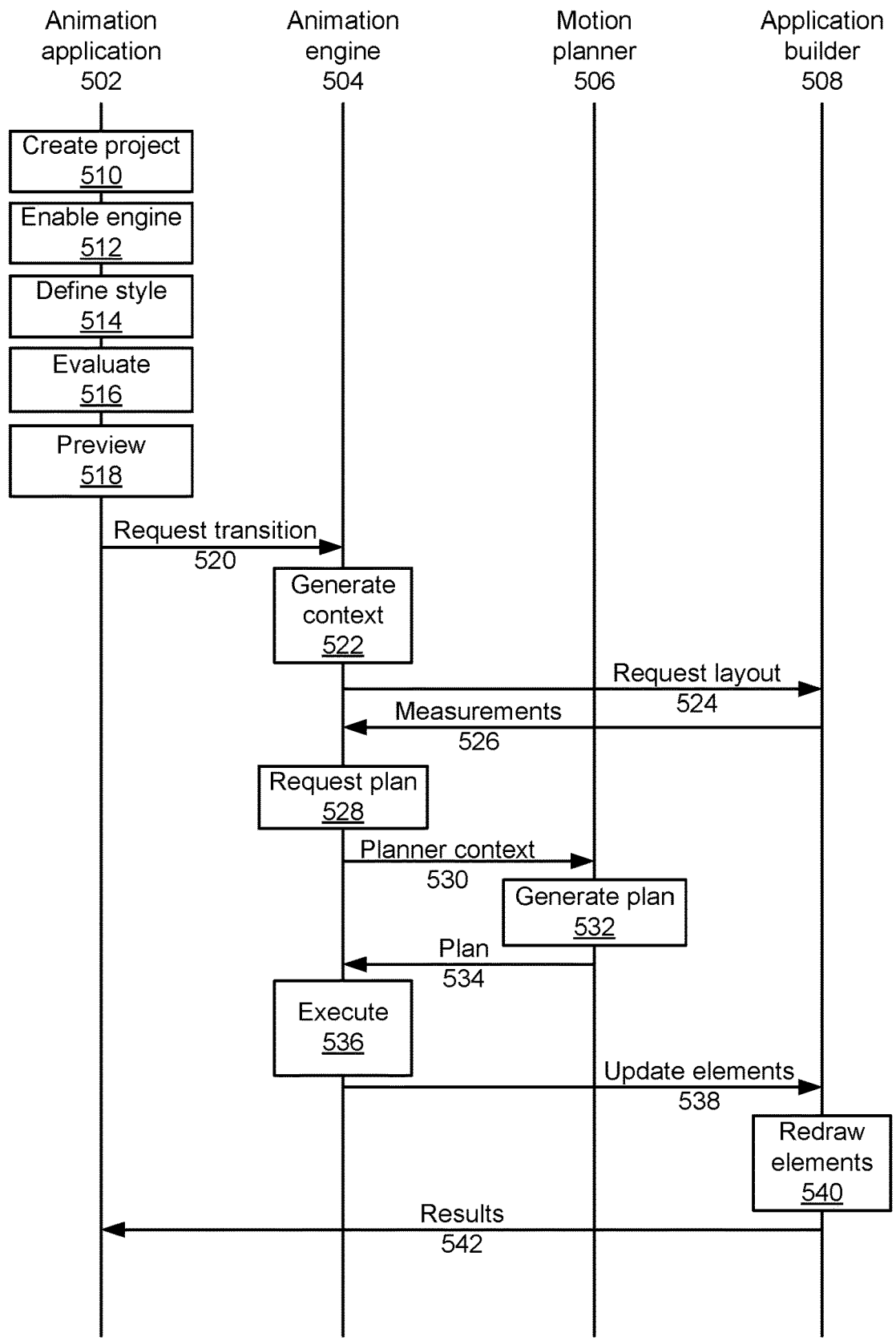
FIG. 5 is a timing diagram showing creation of the animation.

FIG. 5 is a timing diagram showing creation of the animation. Tasks and/or functions performed in creating the animation can be distributed between an animation application 502, an animation engine 504, a motion planner 506, and an application builder 508.

A user, such as an animation designer, can open the animation application 502. The animation application 502 can interface between the user and the animation engine 504. The animation application 502 can create a project (510) in response to user instruction to create a project. The animation application 502 can create the project via the scene builder interface described above. In some examples, if a project has already been created, the animation application 502 can load the project that has already been created. During the creation of the project (510), and/or after an existing project is loaded, the user can create a starting scene such as the starting scene 100 shown and described with respect to FIG. 1A, and an ending scene such as the ending scene 150 shown and described with respect to FIG. 1B.

After loading and/or creating the project (510), the animation application 502 can enable the animation engine (512). The animation application 502 can enable the animation engine (512) by launching the animation engine 504. The animation application 502 can define a motion style (514). The animation application 502 can define the motion style (514), such as straight-line movements or curved paths for graphical elements, based on user preference, such as based on user input.

In some examples, the animation application 502 can switch to an evaluate tab (516). The animation application 502 can switch to the evaluate tab (516) in response to user input. In the evaluate tab, the user can provide input regarding preferred animations. In some examples, the animation application 502 can increase or decrease scores of candidate animations based on similarity of preferred animations.

The animation application 502 can present a preview (518). The animation application 502 can present the preview (518) by, for example, switching a preview mode in response to user input. In some examples, the animation application 502 can resize the preview in response to user input.

The animation application 502 can request transitions 520 from the animation engine 504. The request for transitions 520 can include the starting scene and ending scene created during the creation of the project (510).

In response to receiving the request for transitions 520, the animation engine 504 can generate a context (522) for the animation. The context can include the starting and ending scenes, including the graphical elements included in the starting and ending scenes.

The animation engine 504 can request a layout 524 from the application builder 508. The request for the layout 524 can request layouts, such as widths and heights, of current and/or target user interfaces. The application builder 508 can respond to the request for the layout 524 by returning measurements 526 to the animation engine 504.

After receiving the measurements 526, the animation engine 504 can request a plan (528). The animation engine 504 can request the plan (528) by sending a planner context 530 to the motion planner 506. The planner context 530 can include the starting scene and ending scene, and the measurements 526.

In response to receiving the planner context 530, the motion planner 506 can generate a plan (532). Generating the plan (532) can include determining transitions of graphical elements from the starting scene to the ending scene, such as paths of motion from starting locations to ending locations, and/or changes of appearance of the graphical elements.

After generating the plan (532), the motion planner 506 can send the plan 534 to the animation engine 504. The plan 534 can include the transitions of graphical elements from the starting scene to the ending scene, such as paths of motion from starting locations to ending locations, and/or changes of appearance of the graphical elements. After receiving the plan 534 from the motion planner 506, the animation engine 504 can execute the animation (536). The animation engine 504 can execute the animation (536) by generating a series of frames that transitions the graphical elements and/or window from their respective locations and/or appearances in the starting scene to their respective locations and/or appearances in the ending scene.

After executing the animation (536), the animation engine 504 can update the graphical elements 538 for the application builder 508. The animation engine 504 can update the graphical elements on a frame-by-frame basis, adjusting the location and/or appearance of each graphical element within each frame. After receiving the updated graphical elements 538, the application builder 508 can redraw the graphical elements (540). The application builder 508 can redraw the graphical elements (540) by modifying the graphical elements to comply with the updates to the graphical elements. After redrawing the graphical elements (540), the application builder 508 can send the results 542 to the animation application 502. The results 542 can include the final animation, transitioning from the starting scene to the ending scene. The animation application can present the results, including the final animation, to the user and/or animation designer.

Figure 6:
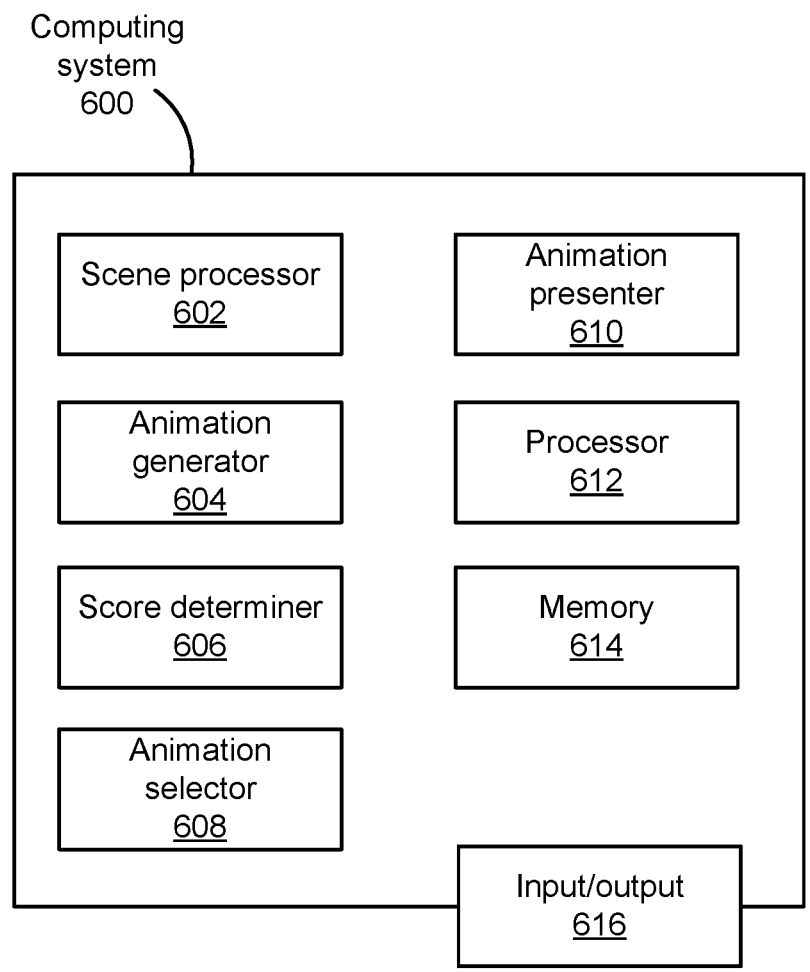
FIG. 6 is a block diagram of a computing system that can create the animation.

FIG. 6 is a block diagram of a computing system 600 that can create the animation. In some examples, the computing system 600 can implement the animation application described above with respect to FIGS. 1A and 1B. The computing system 600 may have the technical benefit of reducing the time and resource usage involved in creating animations and selecting an optimal animation.

The computing system 600 can include a scene processor 602. The scene processor 602 can receive, for example, a starting scene 100 and an ending scene 150 via input from an animation designer. The scene processor 602 can receive and store the scenes 100, 150, and the graphical elements 400 associated with the scenes 100, 150. The scene processor 602 can also receive a device form factor, such as a size of a display on which to present the animation.

In some examples, the scene processor 602 can generate, launch, and/or implement the scene builder interface described above with respect to FIGS. 1A and 1B. The scene builder interface can present graphical elements to an animation designer via a display and/or receive selections and placements of graphical elements in locations within a starting scene and/or ending scene. The scene builder interface can access and/or present graphical elements from a graphical interface library stored in memory 614. The graphical interface library can store many graphical elements, which can include clip art, icons, and/or drawings loaded and/or created by the animation designer, as non-limiting examples.

The computing system 600 can include an animation generator 604. The animation generator 604 can generate multiple individual candidate animations based on the scenes 100, 150 received and/or stored by the scene processor 602. The candidate animations can be constrained by the received device form factor. The animation generator 604 can, for example, generate, for each individual candidate animation, a transition for each graphical element from a starting position to an ending position, and/or from a starting appearance to an ending appearance. In some examples, the transition generated for each graphical element can be independent of the transitions generated for other graphical elements. The animation generator 604 can generate movements for each graphical element, such as straight-line movements along continuous paths, arced movements along continuous paths, fading out of the starting scene and into the ending scene, and moving out of the scene and/or window of the starting scene and into the scene and/or window of the ending scene, as non-limiting examples.

In some examples in which the animation application determines transitions for the graphical elements in order based on relative priorities of the graphical elements, the animation application can determine the transitions based on heuristics, rules, machine learning techniques, optimization techniques, and/or decision trees. For example, after transitioning a graphical element with a highest priority, the animation application can determine a transition for the graphical element with the next priority based on a rule such as not allowing the graphical element with the next priority to cross paths with the graphical element with the highest priority. Similar rules can be applied to subsequent determinations of transitions of graphical elements with lower priorities. The animation generator 604 can store rules for transitioning graphical elements with respect to previously-determined transitions of graphical elements in the transition library stored in the memory 614.

In some examples, the animation generator 604 can generate multiple individual candidate animations by selecting and/or generating different combinations of transitions for the graphic elements of the individual candidate animations. The animation generator 604 can, for an individual candidate animation, generate a transition for the graphical elements from the starting scene to the ending scene. In some examples, the animation generator 604 can select transitions from a transition library of predetermined transitions stored in memory 614. In some examples, animation generator 604 can randomly select transitions from a transition library. The transitions can be along straight lines with either constant or changing speeds, along arcs with different degrees of bending away from a straight line with either constant or changing speeds, along curved paths with either constant or changing speeds, or fading out of the starting position and into the ending position. In some examples, the animation generator 604 can randomly select, from a set of predetermined transitions stored in the transition library, a transition for each graphical element from the starting scene to the ending scene. The predetermined transitions, which can be stored in the transition library, can include movements with constant or varying speeds along straight lines, arcs, or curved paths, facing out and into the scene at different locations, or moving out and back into the scene along a straight or curved path, as non-limiting examples. The random selections can be different for each individual candidate animation, generating candidate animations with multiple permutations of transitions by the elements included in the starting scene and/or ending scene.

In examples in which a graphical element is present in the starting scene but is not present in the ending scene, the animation generator 604 can transition the graphical element out of the scene. In some examples, the animation generator 604 can transition the graphical element out of the scene by fading the graphical element out, and/or gradually reducing a color contrast or difference between the graphical element and a background. In some examples, the animation generator 604 can transition the graphical element out of the scene by moving the graphical element out of the window, so that successively smaller portions of the graphical element are visible. In examples in which a graphical element is present in the ending scene but not in the starting scene, the animation generator 604 can transition the graphical element into the scene, such as by fading the graphical element in or moving the graphical element into the window.

In examples in which an ending appearance of a graphical element is different that a starting appearance of the graphical element, the animation generator 604 can generate the change in appearance of the graphical element, such as a gradual transition of color or shape of the graphical element. Where the shape of the graphical element changes, the shape can change based on specified degrees of freedom for a particular graphical element, such as joints between a leg and a body, joints within the legs, and joints between the legs and the feet, as non-limiting examples.

The computing system 600 can include a score determiner 606. The score determiner 606 can determine a score for each of the individual candidate animations generated by the animation generator 604. In some examples, the scores determined by the score determiner 606 can be considered costs. The score determiner 606 can determine the scores for each of the candidate animations based on the transitionings of some or all of the graphical elements independent of the other graphical elements, and/or based on the transitionings of some or all of the graphical elements with respect to the other graphical elements.

In some examples, the determined score and/or cost can be based on whether a first graphical element crosses paths with a second graphical element during the candidate animation and/or transition. In some examples, the score and/or cost can be based on whether a graphical element includes text that rotates during the transitioning of the graphical element and/or candidate animation. In some examples, a shape of the ending scene is different than a shape of the starting scene, and the score and/or cost can be based on whether less than all of a graphical element is displayed for a portion of the candidate animation. In some examples, a shape of the ending scene can be different than a shape of the starting scene, and the score can be based on whether less than all of the graphical element is displayed for a portion of the candidate animation. In some examples, an animation designer can specify the cost and/or impact to the score of certain transitions, such as graphical elements crossing paths, text rotating, and/or less than all of a graphical element being displayed for a portion of the candidate animation. The computing system 600 can receive and/or apply the specified cost and/or impact to the score. In some examples, the score determiner 606 can generate an interface, such as a graphical user interface, that receives input from the animation designer to modify the cost and/or impact to the score of certain transitions. In some examples, the interface to receive input to modify the cost and/or impact to the score can be included in the scene builder interface. In some examples, the interface can provide a list of factors that the user can select or weight, such as overall time for animation or transition, favoring rectilinear transitions, changing color during transition, and/or avoiding crossing paths between elements, as non-limiting examples. The interface can avoid the need for the animation designer to input computer-executable code into the computing system 600. In some examples, the animation designer can modify and/or set the cost and/or impact to the score of certain transitions via computer-executable code, such as the computer-executable code by which the animation designer can build the starting and ending scenes in some examples.

In some examples, the computing system 600 can present multiple candidate animations to the animation designer can select preferred animations. The computing system 600 can change the cost and/or impact to the score for certain transitions based on the received preferences, such as by favoring transitions included in more preferred animations and disfavoring transitions included in less preferred animations.

In some examples, the animation designer and/or user can specify a part of the animation. The animation designer can specify a transition such as a path for a particular graphical element, and/or the animation generator 604 can receive a transition and/or path for the particular graphical element. The score determiner 606 can determine the score based on the transitions of the graphical elements for which transitions and/or paths were not specified independent of any other graphical elements, and based on transitions of the graphical elements for which paths were not specified with respect to other graphical elements, including the graphical element for which the path was specified. The score determiner 606 can determine the score for the animation without determining a score or cost for the graphical element for which the transition and/or path was specified and/or received, because the transition and/or path for the graphical element for which the path was specified is fixed and does not distinguish candidate animations.

The computing system 600 can include an animation selector 608. The animation selector 608 can select one of the candidate animations based on the score and/or cost determined by the score determiner 606. In some examples, the animation selector 608 can select a candidate animation with a highest score. In some examples, such as when the score determiner determines a cost for each of the candidate animations, the animation selector 608 can select a candidate animation with a lowest score.

The computing system 600 can include an animation presenter 610. The animation presenter 610 can present the selected candidate animation to the animation designer, and/or send the selected animation designer to another computing system for presentation to the user.

The computing system 600 can include at least one processor 612. The at least one processor 216 can include one or more processors, and can be included in one or more computing devices. The at least one processor 612 can execute instructions, such as instructions stored in memory, to cause the computing system 600 to perform any combination of methods, functions, and/or techniques described herein.

The computing system 600 can include at least one memory device 614. The at least one memory device 614 can be included in one or more computing devices. The at least one memory device 614 can include a non-transitory computer-readable storage medium. The at least one memory device 614 can store instructions that, when executed by the at least one processor 612, cause the computing system 600 to perform any combination of methods, functions, and/or techniques described herein. The at least one memory device 614 can store data accessed to perform, and/or generated by, any combination of methods, functions, and/or techniques described herein. The at least one memory device 614 can store the scenes 100, 150, the graphical elements 400 associated with the scenes 100, 150, and the animations.

The computing system 600 can include one or more input/output nodes 616. The input/output nodes 616 can receive and/or send signals from and/or to other computing devices. The input/output nodes 616 can include devices for receiving input from a user, such as via a keyboard, mouse, and/or touchscreen. The input/output nodes 616 can also include devices for providing output to a user, such as a screen or monitor, printer, or speaker. The input/output nodes 616 can also include devices for communicating with other computing devices, such as networking and/or communication interfaces including wired interfaces (such as Ethernet (Institute for Electrical and Electronics Engineers (IEEE) 802.3), Universal Serial Bus (USB), coaxial cable, and/or High Definition Multiple Input (HDMI)), and/or wireless interfaces (such as Wireless Fidelity (IEEE 802.11), Bluetooth (IEEE 802.15), and/or a cellular network protocol such as Long-Term Evolution (LTE) and/or LTE-Advanced), as non-limiting examples.

Figure 7:
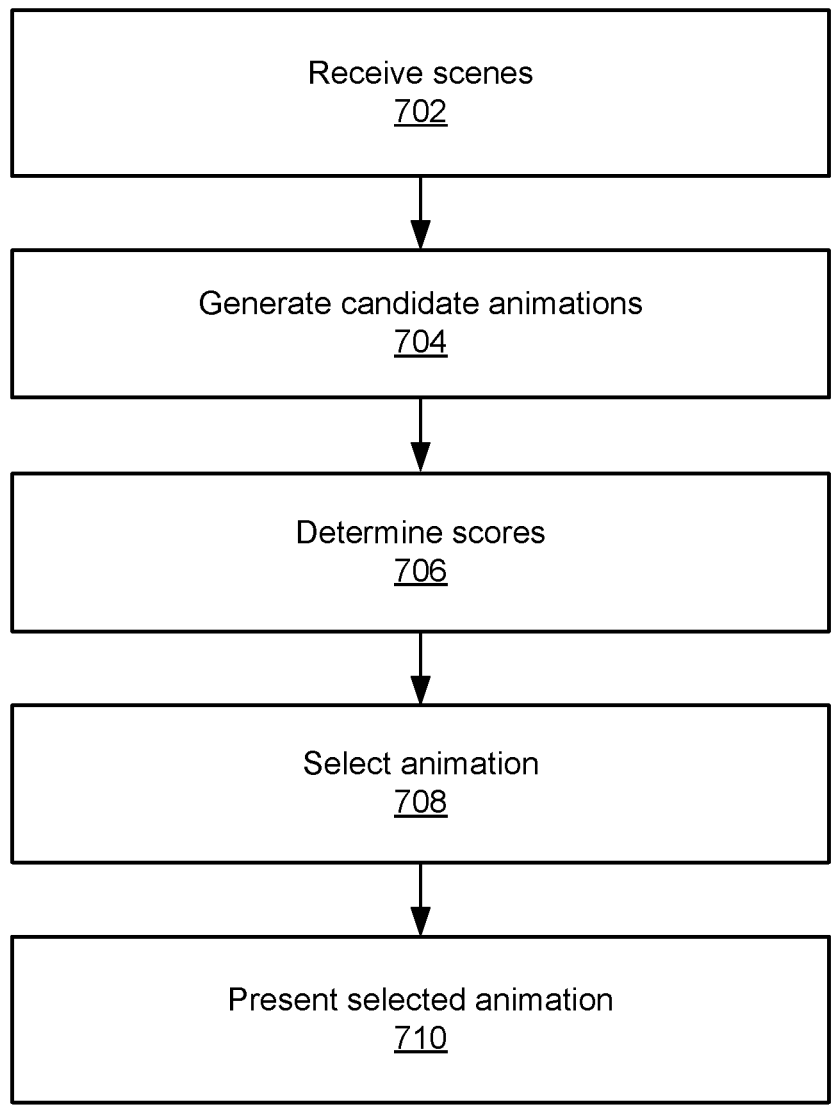
FIG. 7 is a flowchart showing a method of creating the animation.

FIG. 7 is a flowchart showing a method of creating the animation. The method can include receiving scenes (702), such as receiving, by a computing system, a starting scene for display and an ending scene for display, the starting scene including at least a first graphical element in a first location and a second graphical element in a second location, the ending scene including at least the first graphical element in a third location and the second graphical element in a fourth location, the first location being different than the third location, the third location being different than the fourth location. The method can include generating candidate animations (704), such as generating multiple individual candidate animations based on the starting scene and the ending scene, each of the multiple candidate animations including display of the first graphical element transitioning from the first location to the second location and display of the second graphical element transitioning from the third location to the fourth location. The method can include determining scores (706), such as, for each of the multiple individual candidate animations, determining a score, the score being based on the transitioning of the first graphical element independent of the second graphical element for the individual candidate animation, the transitioning of the second graphical element independent of the first graphical element for the individual candidate animation, and the transitioning of the first graphical element with respect to the transitioning of the second graphical element for the individual candidate animation. The method can include selecting an animation (708), such as selecting one of the individual candidate animations based on the determined scores for the individual candidate animations. The method can include presenting the selected animation (710), such as presenting the selected individual candidate animation.

According to an example, the first graphical element can comprise a graphical user interface element configured to receive input and prompt a response to the received input.

According to an example, the score can be based on the transitioning of the first graphical element with respect to the transitioning of the second graphical element comprises the score being based on whether the first graphical element crosses paths with the second graphical element.

According to an example, the score can be based on the transitioning of the second graphical element independent of the first graphical element comprises the score being based on whether the second graphical element includes text that rotates during the transitioning of the second graphical element.

According to an example, a shape of the ending scene can be different than a shape of the starting scene, and the score can be based on the transitioning of the first graphical element independent of the second graphical element comprises the score being based on whether less than all of the first graphical element is displayed for a portion of the candidate animation.

According to an example, a shape of the ending scene can be different than a shape of the starting scene, and the score can be based on the transitioning of the second graphical element independent of the first graphical element comprises the score being based on whether less than all of the second graphical element is displayed for a portion of the candidate animation.

According to an example, the method can further include receiving a path for a third graphical element, the third graphical element being included in a fifth location of the starting scene and in a sixth location of the ending scene, the fifth location being different than the sixth location. Each of the multiple candidate animations can include the first graphical element transitioning from the first location to the second location, the second graphical element transitioning from the third location to the fourth location, and the third graphical element transitioning from the fifth location to the sixth location along the received path. The score for each of the multiple candidate animations can be based on the transitioning of the first graphical element independent of the second graphical element, the transitioning of the second graphical element independent of the first graphical element, the transitioning of the first graphical element with respect to the transitioning of the second graphical element, the transitioning of the first graphical element with respect to the transitioning of the third graphical element, and the transitioning of the second graphical element with respect to the transitioning of the third graphical element.

According to an example, the first graphical element can have a first appearance in the starting scene and a second appearance in the ending scene, the first appearance being different than the second appearance, the method can further include determining a transition for the first graphical element from the first appearance to the second appearance, and each of the candidate animations can include the first graphical element transitioning from the first appearance to the second appearance while the first graphical element transitions from the first location to the second location.

According to an example, the first graphical element transitioning from the first location to the third location can include the first graphical element moving from the first location to the third location along a continuous path.

According to an example, the first graphical element transitioning from the first location to the third location can include the first graphical element fading out of the first location and fading into the third location.

As will be appreciated, the systems and methods for facilitating the creation of animations described herein may have the technical benefit of avoiding the need for one or more animation programmers to program the many possible transitions and determine which one to use (which is a complex and time-consuming task). Thus, the systems and methods may reduce the time and complexity associated with the generation of animated transitions between first and second graphical user interface arrangements. Since the systems and methods described herein may reduce the time from conception of the animation to execution of the animation, they may also serve to reduce power consumption, at least in part by reducing the time that a computer is in use while the animation is being developed.

Figure 8:
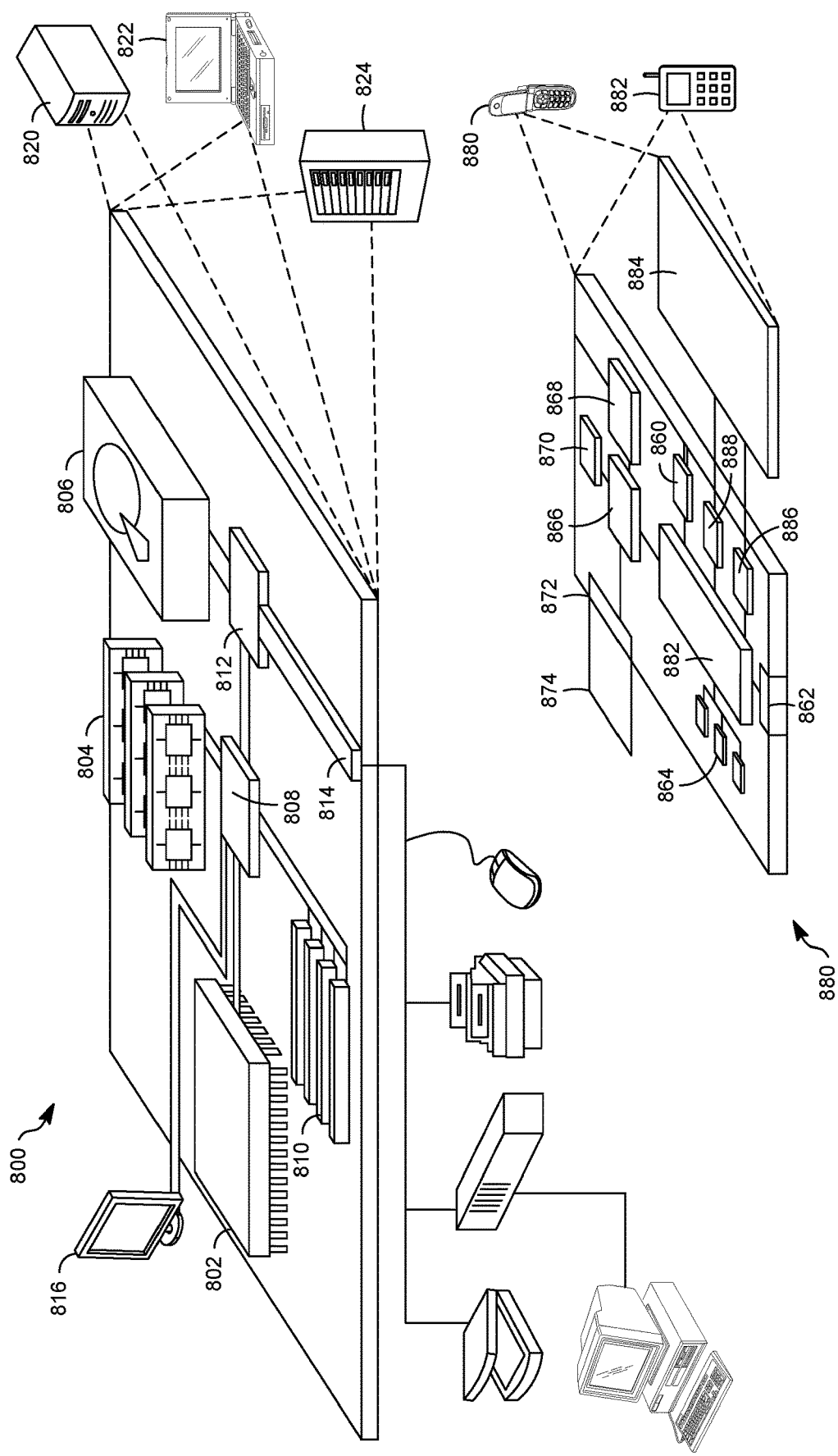
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   based on a starting scene and an ending scene, generating candidate animations that include respective transitions of a first graphical element transitioning from a first location to a second location and transitions of a second graphical element from a third location to a fourth location;
   determining respective scores for the candidate animations, the respective score for a candidate animation being based on the transitioning of the first graphical element with respect to the transitioning of the second graphical element for the candidate animation;
   selecting one of the candidate animations based on the respective scores; and
   presenting the selected candidate animation.

2. The method of claim 1, wherein the first graphical element comprises a graphical user interface element configured to receive input and prompt a response to the received input.

3. The method of claim 1, wherein the respective score being based on the transitioning of the first graphical element with respect to the transitioning of the second graphical element comprises the score being based on whether the first graphical element crosses paths with the second graphical element.

4. The method of claim 1, wherein the respective score is further based on whether the second graphical element includes text that rotates during the transitioning of the second graphical element.

5. The method of claim 1, wherein:
   a shape of the ending scene is different than a shape of the starting scene; and
   the respective score is further based on whether less than all of the first graphical element is displayed for a portion of the candidate animation.

6. The method of claim 1, wherein:
   a shape of the ending scene is different than a shape of the starting scene; and
   the respective score is further based on whether less than all of the second graphical element is displayed for a portion of the candidate animation.

7. The method of claim 1, wherein the method further comprises:
   receiving a path for a third graphical element, the third graphical element being included in a fifth location of the starting scene and in a sixth location of the ending scene, the fifth location being different than the sixth location,
   wherein the candidate animations include the first graphical element transitioning from the first location to the second location, the second graphical element transitioning from the third location to the fourth location, and the third graphical element transitioning from the fifth location to the sixth location along the received path, and
   wherein the respective scores for the candidate animations are based on:
      the transitioning of the first graphical element independent of the second graphical element,
      the transitioning of the second graphical element independent of the first graphical element,
      the transitioning of the first graphical element with respect to the transitioning of the second graphical element,
      the transitioning of the first graphical element with respect to the transitioning of the third graphical element, and
      the transitioning of the second graphical element with respect to the transitioning of the third graphical element.

8. The method of claim 1, wherein:
   the first graphical element has a first appearance in the starting scene and a second appearance in the ending scene, the first appearance being different than the second appearance;
   the method further includes determining a transition for the first graphical element from the first appearance to the second appearance; and
   the candidate animations include the first graphical element transitioning from the first appearance to the second appearance while the first graphical element transitions from the first location to the second location.

9. The method of claim 1, wherein the first graphical element transitioning from the first location to the second location includes the first graphical element moving from the first location to the second location along a continuous path.

10. The method of claim 1, wherein the first graphical element transitioning from the first location to the second location includes the first graphical element fading out of the first location and fading into the second location.

11. A non-transitory computer-readable storage medium comprising instructions stored thereon that, when executed by at least one processor, are configured to cause a computing system to:
based on a starting scene and an ending scene, generate candidate animations that include respective transitions of a first graphical element from a first location to a second location and transitions of a second graphical element from a third location to a fourth location;
determine respective scores for the candidate animations, the respective score for a candidate animation being based on the transitioning of the first graphical element with respect to the transitioning of the second graphical element for the candidate animation;
select one of the candidate animations based on the respective score; and
present the selected candidate animation.

12. The non-transitory computer-readable storage medium of claim 11, wherein the first graphical element comprises a graphical user interface element configured to receive input and prompt a response to the received input.

13. The non-transitory computer-readable storage medium of claim 11, wherein the score being based on the transitioning of the first graphical element with respect to the transitioning of the second graphical element comprises the score being based on whether the first graphical element crosses paths with the second graphical element.

14. The non-transitory computer-readable storage medium of claim 11, wherein the respective score is further based on whether the second graphical element includes text that rotates during the transitioning of the second graphical element.

15. The non-transitory computer-readable storage medium of claim 11, wherein:
the instructions are further configured to cause the computing system to receive a path for a third graphical element, the third graphical element being included in a fifth location of the starting scene and in a sixth location of the ending scene, the fifth location being different than the sixth location,
the candidate animations include the first graphical element transitioning from the first location to the second location, the second graphical element transitioning from the third location to the fourth location, and the third graphical element transitioning from the fifth location to the sixth location along the received path, and
the respective scores for the candidate animations are based on:
the transitioning of the first graphical element independent of the second graphical element,
the transitioning of the second graphical element independent of the first graphical element,
the transitioning of the first graphical element with respect to the transitioning of the second graphical element,
the transitioning of the first graphical element with respect to the transitioning of the third graphical element, and
the transitioning of the second graphical element with respect to the transitioning of the third graphical element.

16. The non-transitory computer-readable storage medium of claim 11, wherein:
the first graphical element has a first appearance in the starting scene and a second appearance in the ending scene, the first appearance being different than the second appearance;
the instructions are further configured to determine a transition for the first graphical element from the first appearance to the second appearance; and
the candidate animations include the first graphical element transitioning from the first appearance to the second appearance while the first graphical element transitions from the first location to the second location.

17. The non-transitory computer-readable storage medium of claim 11, wherein the first graphical element transitioning from the first location to the second location includes the first graphical element moving from the first location to the second location along a continuous path.

18. The non-transitory computer-readable storage medium of claim 11, wherein the first graphical element transitioning from the first location to the second location includes the first graphical element fading out of the first location and fading into the second location.

19. A computing system comprising:
at least one processor; and
a non-transitory computer-readable storage medium comprising instructions stored thereon that, when executed by at least one processor, are configured to cause the computing system to:
based on starting scene and an ending scene, generate candidate animations that include a first graphical element transitioning from a first location to a second location and a second graphical element transitioning from a third location to a fourth location;
determine respective scores for the candidate animations, the respective score for a candidate animation being based on
the transitioning of the first graphical element with respect to the transitioning of the second graphical element for the candidate animation;
select one of the candidate animations based on the determined score; and
present the selected candidate animation.

20. The computing system of claim 19, wherein, the first graphical element comprises a graphical user interface element configured to receive input and prompt a response to the received input.

* * * * *

UNITED STATES PATENT AND TRADEMARK OFFICE
CERTIFICATE OF CORRECTION

| | |
|---|---|
| PATENT NO. | : 11,200,720 B2 |
| APPLICATION NO. | : 16/731735 |
| DATED | : December 14, 2021 |
| INVENTOR(S) | : Sachter-Zeltzer et al. |

It is certified that error appears in the above-identified patent and that said Letters Patent is hereby corrected as shown below:

In the Claims

In Column 26, Claim 19, Line 38, delete "on" and insert -- on a --, therefor.

In Column 26, Claim 19, Lines 46-48, delete "the transitioning of the first graphical element with respect to the transitioning of the second graphical element for the candidate animation;" and insert the same at "Line 45" after "being based on" as a continuation point.

Signed and Sealed this
Nineteenth Day of April, 2022

Katherine Kelly Vidal
*Director of the United States Patent and Trademark Office*